(12) United States Patent
Cianciotto et al.

(10) Patent No.: US 7,173,775 B2
(45) Date of Patent: Feb. 6, 2007

(54) LIGHT MIXING HOMOGENIZER APPARATUS AND METHOD

(75) Inventors: Frank T Cianciotto, Tehachapi, CA (US); George H Butler, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/126,974

(22) Filed: May 11, 2005

(65) Prior Publication Data

US 2006/0256449 A1   Nov. 16, 2006

(51) Int. Cl.
- *G02B 17/00* (2006.01)
- *G02B 6/00* (2006.01)
- *F21V 7/04* (2006.01)
- *G09F 13/00* (2006.01)

(52) U.S. Cl. ...................................... 359/726; 362/551

(58) Field of Classification Search ........ 359/726–728; 362/551–553, 555, 509, 544–545; 385/34, 385/39, 50

See application file for complete search history.

(56) References Cited

U.S. PATENT DOCUMENTS

| | | | |
|---|---|---|---|
| 4,632,513 A | 12/1986 | Stowe et al. | |
| 5,054,874 A | 10/1991 | Hill et al. | |
| 5,375,185 A | 12/1994 | Hermsen et al. | |
| 5,553,183 A | 9/1996 | Bechamps | |
| 5,828,505 A | 10/1998 | Farmiga | |
| 6,104,857 A | 8/2000 | Ishiharada et al. | |
| 6,112,004 A | 8/2000 | Colvin | |
| 6,149,289 A | 11/2000 | Kuramitsu et al. | |
| 6,324,330 B1 | 11/2001 | Stites | |
| 6,595,673 B1 * | 7/2003 | Ferrante et al. | 362/551 |
| 6,771,870 B2 | 8/2004 | Strobl et al. | |
| 6,792,190 B2 | 9/2004 | Xin et al. | |
| 6,801,701 B1 | 10/2004 | Montgomery et al. | |
| 2004/0137089 A1 | 7/2004 | Dinan | |
| 2004/0137189 A1 | 7/2004 | Tellini et al. | |
| 2005/0084210 A1 | 4/2005 | Cha | |
| 2005/0162853 A1 | 7/2005 | Jain | |
| 2005/0174658 A1* | 8/2005 | Long et al. | 359/833 |

OTHER PUBLICATIONS

Co-pending U.S. Appl. No. 10/744,922 filed Dec. 23, 2003, Now US 20050135766.
Co-Pending U.S. Appl. No. 10/857,073, filed May 28, 2004.
Co-Pending U.S. Appl. No. 11/154,079, filed Jun. 15, 2005.
Co-Pending U.S. Appl. No. 11/173,621, filed Jul. 1, 2005.

* cited by examiner

*Primary Examiner*—Alicia M Harrington
(74) *Attorney, Agent, or Firm*—Harness Dickey & Pierce P.L.C.

(57) ABSTRACT

A light mixing apparatus and method for mixing two Gaussian profile input light beams of different frequencies to form a third, homogenized output light beam having a top hat profile. The apparatus includes a first homogenizer tube having interfaced to it a second homogenizer tube. The second homogenizer tube includes an outer tubular portion which receives inside of it a tubular subassembly having an optical element at one end. The optical element is positioned to reside within the first homogenizer tube at a 45° angle relative to a longitudinal axis of the first homogenizer tube. The optical element is transmissive on one surface and on the opposite surface includes a reflective surface for reflecting light traveling through the second homogenizer tube along the longitudinal axis of the first homogenizer tube. The apparatus forms a robust yet efficient means for mixing Gaussian profile light beams of different wavelengths to produce an output light beam having a top hat profile and a desired color.

19 Claims, 5 Drawing Sheets

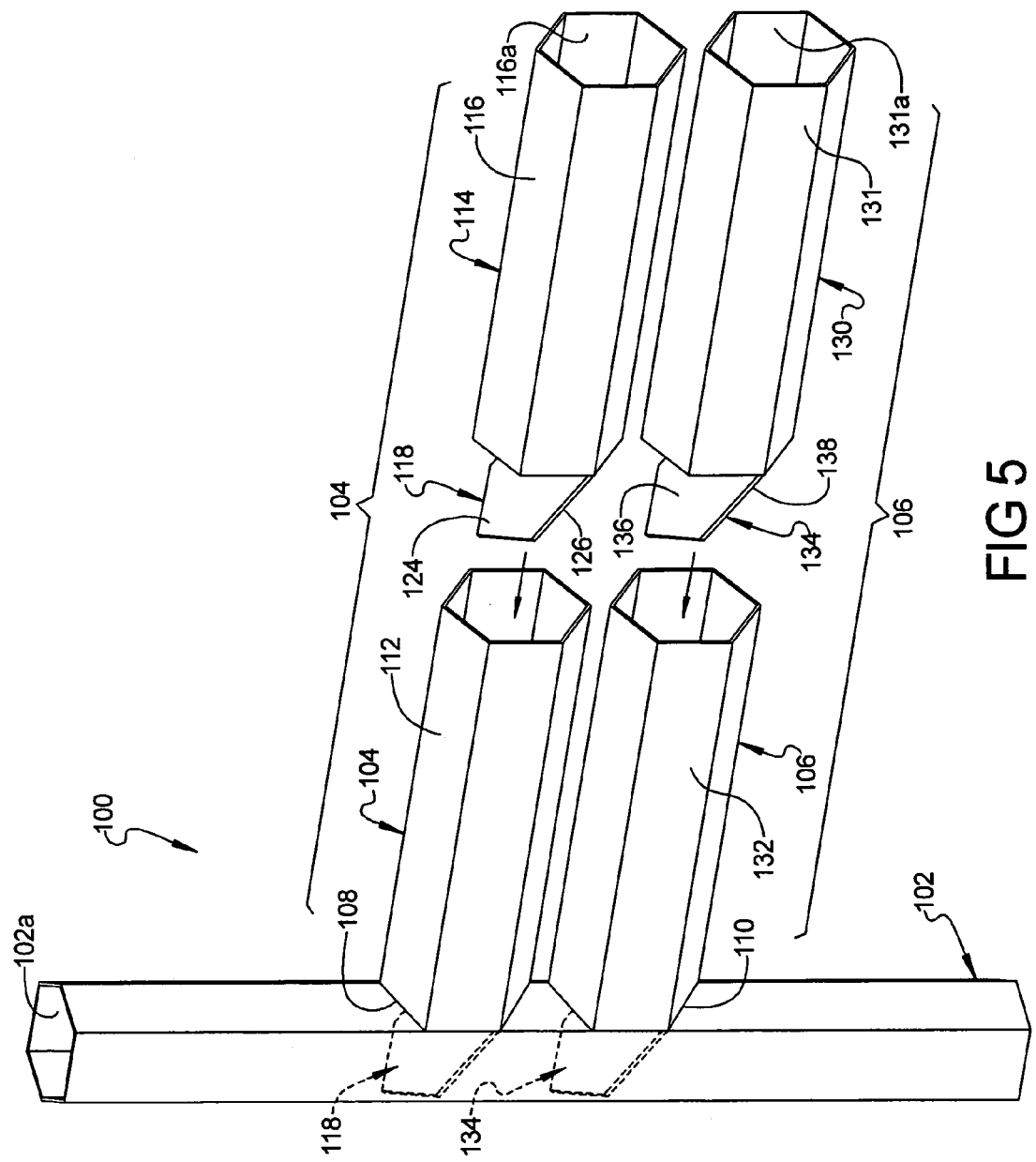

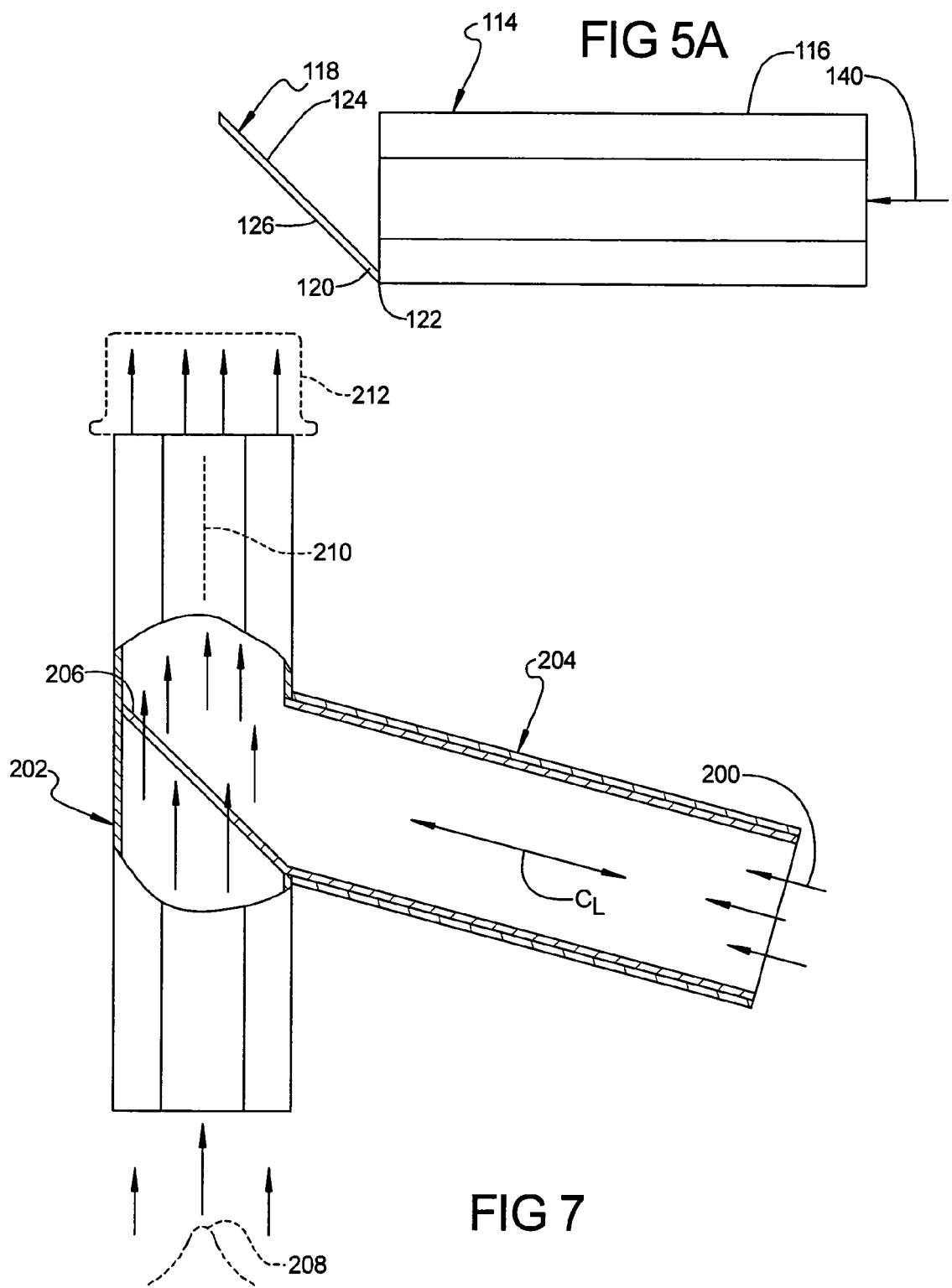

LIGHT MIXING HOMOGENIZER APPARATUS AND METHOD

FIELD OF THE INVENTION

The present invention relates to light mixing systems and methods and, more particularly, to a system and method for mixing two or more Gaussian profile light beams to form a third output which is the sum of the two or more input beams.

BACKGROUND OF THE INVENTION

In optics base systems, there is often a need to combine multiple light beams to form a single output light beam. However, presently available systems rely on glass optics to mix two or more Gaussian profile input beams. This tends to make the devices quite heavy and fragile. Plus, systems that rely on optics for light beam mixing are also highly susceptible to becoming contaminated from dirt or oils that may exist in the environment in which the device is being used. Still further, present day glass based light mixing systems are fairly costly, easy to damage and not especially efficient.

Accordingly, a need exist for an apparatus that is able to mix two or more Gaussian profile light beams together to form a output beam having a predetermined profile, and which does not rely on traditional glass optics to perform the light mixing function.

SUMMARY OF THE INVENTION

The present invention relates to a light mixing homogenizer for mixing a plurality of Gaussian profile light beams to form a single output light beam having a desired wavelength and color. In one preferred form the apparatus comprises a first tubular element that receives a first Gaussian profile light beam at an input end thereof and passes the first light beam to an output end thereof. Interfaced to the first tubular member is a second tubular member for receiving a second input Gaussian profile light beam. The second tubular member includes an optical component that projects into an interior area of the first tubular member intermediate the input and output ends of the first tubular member. The optical element includes a first surface which is reflected and a second, opposite surface that is transmissive. The second Gaussian profile light beam passing through the second tubular member is reflected by the optical element towards the output end of the first tubular member. The first Gaussian profile light beam passes through the optical element to mix within the first tubular member with the second Gaussian profile light beam. At the output of the first tubular member, a homogenized output beam is produced having a top hat profile. The output beam is essentially the sum of the first and second Gaussian profile light beams.

In one preferred implementation, the second tubular element includes a mirror and hex tube subassembly in which the mirror is secured to one end of the hex tube subassembly. The hex tube subassembly is slidably received in an outer hex tube that is interfaced to an opening in the first tubular member. The mirror is positioned at a 45° angle relative to a longitudinal axis extending through the first tubular member.

In an alternative preferred embodiment a third tubular member is interfaced to the first tubular member intermediate the input and output ends of the first tubular member. The third tubular member is identical in construction to the second tubular member. With this embodiment, three Gaussian profile input light beams can be mixed within the first tubular member to form a top hat profile homogenized output beam having a top hat profile.

The various preferred embodiments provide a light mixing apparatus that is economical to construct, more robust than previously developed light mixing devices, and which can mix a plurality of Gaussian profile input beams to provide an output beam having a desired wavelength and color, as well as the desired top hat profile.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 5 illustrates a light mixing apparatus in accordance with a preferred embodiment of the present invention;

FIG. 5a is a side view of the tubular subassembly shown in FIG. 5;

FIG. 7 is a view of an alternative preferred embodiment illustrating a second homogenizer tube disposed non-perpendicular to a first homogenizer tube.

DETAILED DESCRIPTION OF THE PREFERRED EMBODIMENTS

The following description of the preferred embodiment(s) is merely exemplary in nature and is in no way intended to limit the invention, its application, or uses.

To provide a more thorough understanding of the operation of the preferred embodiments of the present invention, a discussion of the operation of the homogenizer tube used with the various preferred embodiments will be provided first. The homogenizer tube is disclosed in U.S. patent application Ser. No. 10/744,922, filed Dec. 23, 2003, and incorporated by reference into the present application.

Figure 1A:
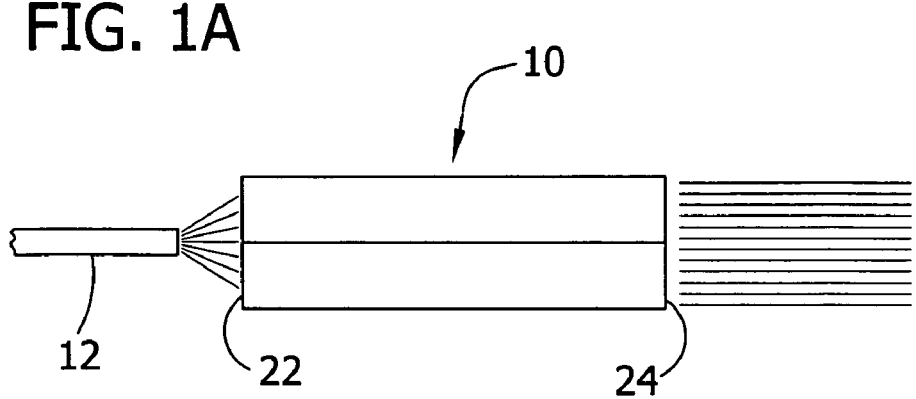
FIG. 1a is a side view of a light source entering a homogenizer tube used with a light mixing system of the present invention.
Figure 1B:
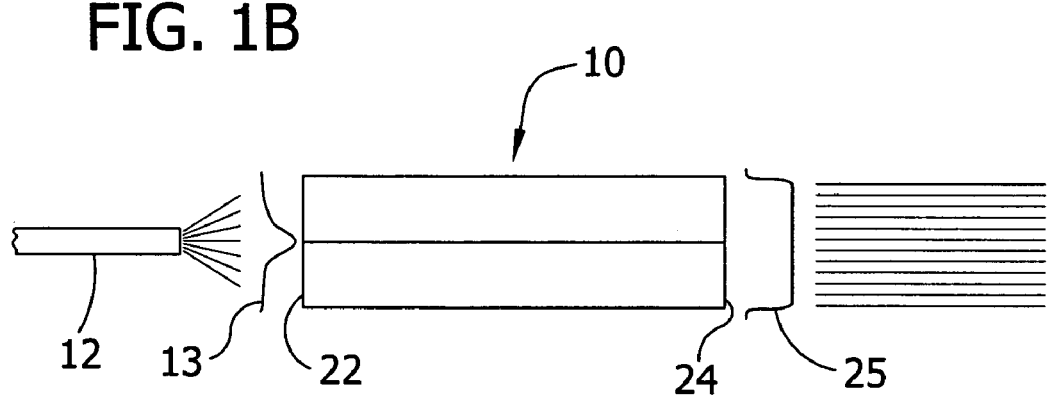
FIG. 1b is a side view of the homogenizer tube of FIG. 1 and also showing a light source as a "Gaussian" profile light beam and the light beam as a "top hat" profile output beam.

Referring to FIGS. 1a and 1b, the homogenizer tube is illustrated. The homogenizer tube 10 forms a hexagonal cross-sectional shaped tube that receives internally from a light source 12 such as a single optical fiber.

The hexagonal cross-sectional tube 10 is formed within an internal highly reflective surface 14 of hexagonal cross-section, preferably formed of gold or silver which forms a first metallic layer 16 having the reflective surface 14. In order to support the relatively thin metallic layer 16 a second metallic layer 18 is provided. This second metallic layer is preferably formed of nickel since it is cheaper than gold or silver and can provide the needed support structure for the relatively thin first layer 16.

Figure 2:
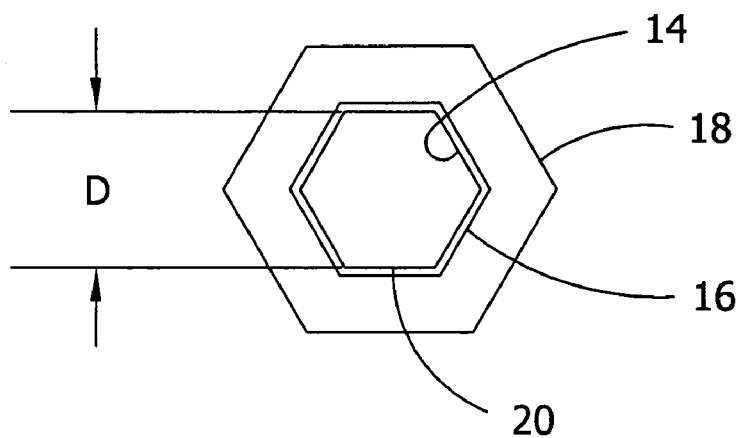
FIG. 2 is a cross-sectional view of a mandrel with multiple layers of metallic coating.

In order to fabricate the hexagonal cross-section tube 10 forming the light homogenizer, a mandrel 20 is utilized (see FIG. 2). Mandrel 20 is preferably made of aluminum and given a surface finish appropriate to produce the desired reflectivity on the internal surface of the tube, as discussed below. The first metallic layer 16 is applied to the mandrel 20 through any of several known techniques such as electroforming. Electroforming is essentially a process of plating the mandrel 20 with a layer of gold or silver to form the layer 16 and then further plating with a layer of nickel to form the outer support member or second metallic surface 18. The aluminum mandrel 20 is then removed from the interior surface 14 by melting, chemically etching, or exploiting differences in thermal coefficients of expansion between the electroformed parts and the mandrel. For example, in the present case, the aluminum mandrel 20 is coated with silver or gold to form the layer 16 and then coated to form the second layer of nickel 18. The aluminum mandrel is then preferably chemically dissolved leaving the nickel hexagonal tube with a highly reflective interior surface of gold or silver. However, other suitable materials may be utilized without departing from the scope of the present invention.

Figure 3:
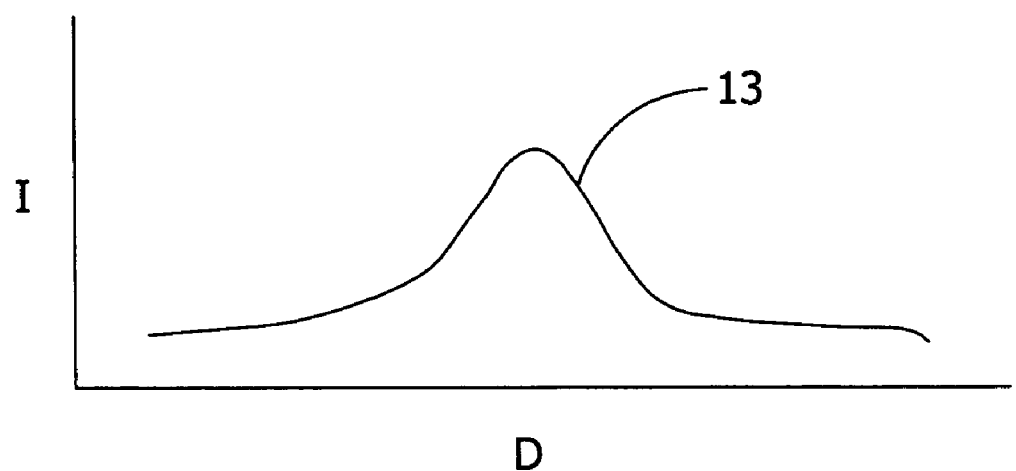
FIG. 3 shows an example of a Gaussian distribution profile from a light source such as that shown in FIG. 1.
Figure 4:
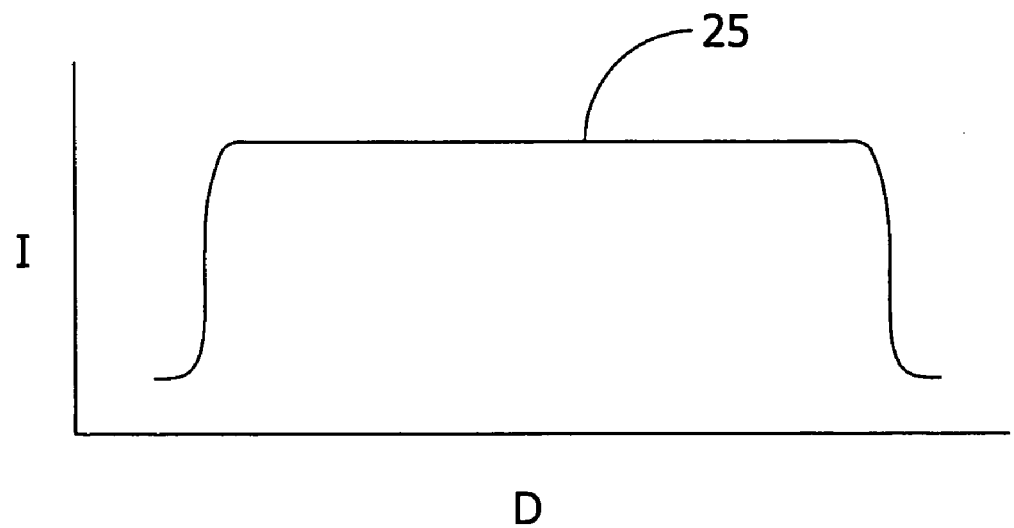
FIG. 4 shows a top hat profile of homogenized light output from the tube of FIG. 1.

The first layer of metallic coating 16 with the internal highly reflective surface 14 is formed of gold or silver or some other selected material which can maximize the performance of the hexagonal tube for specific light spectrums based on the reflectivity of the material, which selection process is well known to those skilled in the art. By the use of this highly reflective internal surface 14, the hex tube is capable of transforming a single fiber optic light output from the Gaussian shape 13 shown in FIGS. 1b and 3 to the top hat profile 25 shown in FIGS. 1b and 4 as an output from the homogenizer tube 10. In FIGS. 3 and 4, the graph shows an exemplary pattern of light intensity (i) versus the distance (D) across the fiber or from land-to-land in the tube 10 as shown as D in FIG. 2. FIG. 1b pictorially shows the "Gaussian" input and "top hat" (homogenous) output.

FIG. 3 is exemplary of the light intensity from a single optic fiber output where the light intensity profile varies across the diameter of the fiber. As shown in FIG. 3, the higher intensity light is in the center of the fiber and decreases near the outer edges of the fiber. When light from the optic fiber 12 enters the end 22 of tube 10 with the profile of FIG. 3 and is reflected from the surfaces of the hexagonal cross-sectional tube 10, it is transformed at the output end 24 of the tube to the top hat pattern of FIG. 4 where the intensity is essentially uniform across the span of the tube from land-to-land. In addition, the relatively small diameter of the light beam coming from a single fiber optic, such as for example, 0.020 inch (0.5 mm) diameter as it exits the optic fiber 12 is transformed in the tube to 0.240 inch (6 mm) from land-to-land at the exit and 24 of tube 10. To achieve this example, a hexagonal tube 10 having an internal light reflective surface having an internal transverse dimension of 0.254 inch (6.35 mm) from flat to opposite flat and a length of 1.016 inch (25.4 mm) was utilized.

The internal length to width (flat-to-flat) dimensions of tube 10 are preferably such that the length is approximately four to five times the internal width of tube 10. This length to width ratio is preferably since a smaller ratio may not allow enough "bounce" of the light to adequately homogenize it before it exits the tube and a substantially larger ratio would allow too much "bounce" of the light which would reduce the energy level of the light at the output of the tube 10. However, other ratios may be used without departing from the scope of the invention.

The surface smoothness of the highly light reflective internal surface 14 can vary substantially depending upon the purpose for which the present system is being utilized. However, in a preferred embodiment where the internal highly light reflective surface is silver the optical smoothness of the surface is preferably in the range of $\lambda/2$ to $\lambda/6$ and more preferably about $\lambda/4$. This is particularly useful where the wave length of the light from the light source is in the visible to near infrared range of approximately 400 to 780 nanometers. This same surface smoothness range is also appropriate for establishing the highly reflective surface for many uses of the present invention so long as the reflectivity of the surface is at least 99 percent. It is envisioned that other optical smoothness and surface reflectivity could be used in the present invention.

The thickness of the internal layer of reflective material can vary as desired so long as it is adequately thick to provide the highly light reflective surface described above. The tube 10 could be formed of a single material so long as it is thick enough to be self supporting. However, for cost reasons, the thickness of the first layer 16, particularly when formed of gold or silver should be relatively thin (for example, about 0.0001 to 0.0002 inch thick) and the second layer 18 should be relatively thick (for example, about 0.010 to 0.020 inch thick). Thicknesses different from the foregoing examples do not depart from the scope of the invention.

Referring now to FIG. 5, an apparatus 100 in accordance with a preferred embodiment of the present invention is shown. Apparatus 10 includes a first homogenizer tube 102, a second homogenizer tube 104, and a third homogenizer tube 106. The second and third homogenizer tubes 104, 106 are interfaced to hex-shaped openings 108 and 110 formed in the first homogenizer tube 102. Homogenizer tubes 104 and 106 are coupled to extend perpendicularly from first homogenizer tube 102. The second and third homogenizer tubes 104 and 106 are identical in construction. First homogenizer tube 102 also includes a reflective coating 102a on its interior wall.

With brief reference to FIGS. 5 and 5a, homogenizer tube 104 comprises an outer tubular portion 112 that is hexagonally shaped when viewed from an end thereof. One end of outer tubular portion 112 is fixedly secured to the first homogenizer tube 102. Within the hexagonally shaped tubular portion 112 is disposed a tubular homogenizer subassembly 114. The tubular homogenizer subassembly 114 is shown in FIG. 5a as well. The tubular subassembly 114 also is hexagonally shaped in crossed-section and includes a tubular portion 116 and an optical element 118. Optical element 118 is fixedly secured at one edge 120, such as by adhesives or mechanical means, to an edge 122 of the tubular portion 116. The optical element 118 has a first surface having a reflective coating 124 and a second (i.e., opposite) surface having a transmissive coating 126. Thus, an input light beam directed into the tubular portion 116, as indicated by arrow 128 in FIGS. 5 and 5a, is reflected off of the reflective surface 124 of the optical element 118 and directed at an angle of about 90° from its initial progation path. However, a light beam directed at the transmissive surface 126 of the optical element 118 passes unimpeded through the optical element. The interior of the tubular portion 116 is also coated with a reflective material 116a as described in connection with FIGS. 1–2. With further reference to FIG. 5, the third homogenizer tube 106 includes a tubular homogenizer subassembly 130 that is constructed identically to tubular homogenizer subassembly 114. A reflective coating 131a is applied to the interior wall of a tubular portion 131. Tubular homogenizer subassembly 130 fits within an outer tubular, hexagonally shaped portion 132 of the third homogenizer tube 106 and includes an optical element 134 identical in construction to optical element 118, with a reflective surface 136 and a transmissive surface 138.

Tubular homogenizer subassemblies 114, 130 can be secured within their respective tubular portions 112, 132 via an end cap (not shown) or an epoxy (or adhesive) applied to the outer surfaces of subassemblies 114, 130. If an end cap is used, the light source could be integrated into the construction of the end cap. Use of an end cap would also allow more ready disassembly of the homogenizer subassemblies 114, 130. Whether using end caps or epoxies (or adhesives) to retain the homogenizer subassemblies 114, 130, the sliding "tube-within-a-tube" construction facilitates manufacture and assembly using an electroforming process in conjunction with small internal pieces.

With further reference to FIGS. 5 and 5a, the outer tubular portion 132 is fixedly secured to the first homogenizer tube 102 at opening 110. The outer tubular portions 112, 132 can each be secured to the homogenized tube 102 using a suitable adhesive (for example, cyanoacylate). Alternatively, the homogenizer tube 102 and outer tubular portions 112, 132 could be formed from a molding process as a single piece component.

Figure 6:
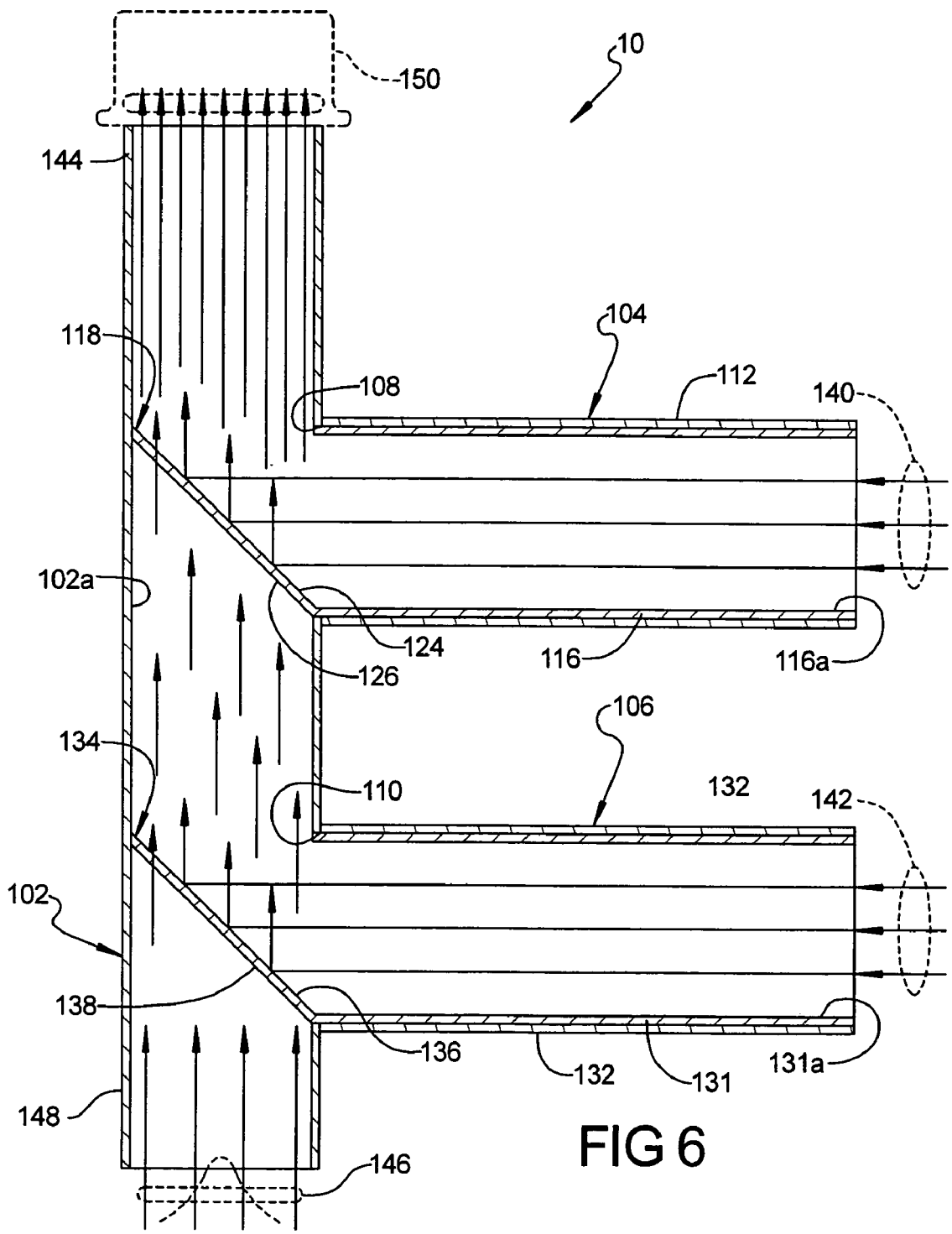
FIG. 6 is a side view of the apparatus of FIG. 5 revealing the optical components disposed within the tubular member and the manner in which the Gaussian profile input light beams are directed within the first tubular member.

Referring to FIG. 6, the operation of the apparatus 100 will now be described. Gaussian profile input light beams 140 and 142 are directed into the second and third homogenizer tubes 104 and 106, respectively. The light beams 140 and 142 are reflected off of optical elements 118 and 134 towards an output end 144 of first homogenizer tube 102. A Gaussian profile input light beam 146 is directed into an input end 148 of first homogenizer tube 102. The input light beam 146 passes through the optical elements 134 and 118 and mixes with the Gaussian profile input beams 140 and 142 prior to exiting the output end 144. The mixed light beams are effectively "summed" to provide a third, or output, light beam 150 having a top hat profile.

The apparatus 10 thus forms an efficient, relatively easy to construct means for mixing two or more Gaussian input light beams to form an output light beam having a desired color (i.e., wavelength). The output light beam has a wavelength that is the sum of the wavelengths of the input light beams. Accordingly, an output beam having a desired color can be generated simply by selecting two or more input beams having desired wavelengths that will sum to the desired output wavelength.

While three input light beams are illustrated in FIG. 6, it will be appreciated that a greater or lesser plurality of input light beams could be utilized and mixed to form an output beam having a desired color. Furthermore, the second and third homogenizer tubes 104 could be formed on different sides of the first homogenizer tube 102 (i.e., so as to be radially offset with one another, rather than radially aligned).

With brief reference to FIG. 7, an apparatus 200 in accordance with an alternative preferred embodiment of the present invention is shown. Apparatus 200 is similar to the apparatus 100 and is intended to illustrate that a second homogenizer tube 204 can be secured to a first homogenizer tube 202 at an angle that is non-perpendicular to the first homogenizer tube 202. Homogenizer tubes 202 and 204 are otherwise identical in construction to homogenizer tubes 104 and 106. Since homogenizer tube 204 is positioned non-perpendicular to tube 202, it will be appreciated that the optical element 206 associated with tube 204 will need to be positioned at an angle other than 45° relative to a longitudinal axis $C_L$ extending through tube 204 to thus be disposed at a 45° angle relative to a longitudinal axis 210 extending through tube 202. The optical element 206 reflects the input light beam 208 along the longitudinal axis 210 of the first homogenizer tube 202. The output light beam 212 also has a top hat profile.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A system for mixing a plurality of independent Gaussian profile light beams of different wavelengths to form a single homogenous output light beam, comprising:
    a first homogenizer tube having a hexagonal cross-sectional shape for receiving a first Gaussian profile light beam having a first frequency; and
    a second homogenizer tube having a hexagonal cross-sectional shape for receiving a second Gaussian profile light beam having a second frequency, said second homogenizer tube including an optical element at a second end thereof opposite to a first end, wherein the first end receives said second Gaussian profile light beam;
    said optical element having a first surface that is reflective for receiving and reflecting said second Gaussian profile light beam, toward an output end of said first homogenizer tube; and
    said optical element having a second surface that is transmissive to pass said first Gaussian profile light beam so that said first and second Gaussian light beams mix at said output end of said first homogenizer tube to form a homogeneous output signal beam having a third frequency.

2. The system of claim 1, wherein said second homogenizer tube includes a tubular homogenizer subassembly slidably received within an outer tubular sleeve portion.

3. The system of claim 1, wherein said first homogenizer tube includes a reflective interior wall.

4. The system of claim 1, wherein said second homogenizer subassembly includes a reflective interior wall portion.

5. The system of claim 1, wherein said optical element comprises a planar optical element disposed at an approximate 45° angle relative to a longitudinal axis of said first homogenizer tube.

6. The system of claim 1, wherein said output signal beam represents the sum of the first and second Gaussian profile light beams.

7. The system of claim 6, wherein said output signal beam has a top hat profile.

8. A system for mixing optical beams, comprising:
    a first homogenizer tube for receiving a first optical input signal to an input end thereof and directing said first optical signal to an output end thereof;
    a second homogenizer tube coupled to said first homogenizer tube, for receiving a second optical input signal at an input end thereof and directing said second optical signal to an output end thereof, said output end thereof being interfaced over an opening in said first homogenizer tube at a point intermediate said input and output ends of said first homogenizer tube;

said output end of said second homogenizer tube positioned inside said first homogenizer tube, and having an optical element being disposed at approximately a 45° angle relative to a longitudinal axis of said first homogenizer tube;

said first optical element including a first surface that is reflective to reflect said second optical signal to said output end of said first homogenizer tube, and a second surface that is transmissive to pass said first optical signal therethrough; and wherein said first and second optical signals are summed within said first homogenizer tube to form a homogeneous output optical signal.

9. The system of claim 8, wherein said output optical signal comprises a top hat profile.

10. The system of claim 8, wherein said first homogenizer tube includes a reflective inner surface.

11. The system of claim 8, wherein said second homogenizer tube comprises a reflective inner surface.

12. The system of claim 8, wherein said first homogenizer tube comprises a hexagonal cross-sectional shape.

13. The system of claim 8, wherein said second homogenizer tube comprises a hexagonal cross-sectional shape.

14. The system of claim 8, wherein said optical element comprises a planar optical element.

15. The system of claim 8, further comprising a third homogenizer tube coupled to an opening in said first homogenizer tube, and an optical component disposed within said first homogenizer tube for reflecting a third input signal directed through said third homogenizer tube to said output end of said first homogenizer tube, wherein said third optical signal mixes with said first and second optical signals to form said homogenous output optical signal.

16. The system of claim 15, wherein said optical component includes a reflective surface and a transmissive surface.

17. The system of claim 16, wherein said optical component is positioned at approximately a 45° angle within said first homogenizer tube, relative to said longitudinal axis of said first homogenizer tube, and adjacent said optical element.

18. The system of claim 17, wherein said second homogenizer tube is coupled to said first homogenizer tube to extend perpendicular to said first homogenizer tube.

19. A method for mixing Gaussian profile optical signals having different wavelengths to produce an output optical signal having a desired wavelength and a top hat profile, the method comprising:

directing a first optical signal through a first light homogenizer having an input end and an output end;

directing a second optical signal through a second light homogenizer and into an interior area of said first light homogenizer at a point intermediate said input end and said output end of said first light homogenizer; and using an optical element positioned within said first light homogenizer to reflect said second optical signal to said output end, while simultaneously enabling said first optical signal to pass through said optical element unimpeded to said output end; and causing said first and second optical signals to mix within said first light homogenizer to form a third, homogenized, optical signal having a wavelength that differs from a wavelength of each of said first and second optical signals, and that has a top hat profile.

* * * * *